United States Patent [19]
Chow et al.

[11] Patent Number: 5,768,596
[45] Date of Patent: Jun. 16, 1998

[54] SYSTEM AND METHOD TO EFFICIENTLY REPRESENT ALIASES AND INDIRECT MEMORY OPERATIONS IN STATIC SINGLE ASSIGNMENT FORM DURING COMPILATION

[75] Inventors: Frederick Chow; Sun Chan, both of Fremont; Shin-Ming Liu, Saratoga; Raymond Lo, Sunnyvale; Mark Streich, Fremont, all of Calif.

[73] Assignee: Silicon Graphics, Inc., Mountain View, Calif.

[21] Appl. No.: 636,605

[22] Filed: Apr. 23, 1996

[51] Int. Cl.$^6$ ...................................................... G06F 9/45
[52] U.S. Cl. ........................ 395/709; 395/705; 395/708
[58] Field of Search .................................. 395/705, 708, 395/709

[56] References Cited

U.S. PATENT DOCUMENTS

| | | | |
|---|---|---|---|
| 5,327,561 | 7/1994 | Choi et al. | 395/700 |
| 5,448,737 | 9/1995 | Burke et al. | 395/700 |
| 5,659,754 | 8/1997 | Grove et al. | 395/709 |

OTHER PUBLICATIONS

"Extended SSA with Factored Use-Def Chains to Support Optimization and Parallelism", Stoltz et al., Proc. of the 27th Ann. Hawaii International Conf. on System Sciences, 1994, pp. 43-52.

Choi et al., "On the Efficient Engineering of Ambitious Program Analysis," *IEEE Transactions on Software Engineering*, vol. 20, No. 2, Feb., 1994, 105-114.

Cytron et al., "Efficiently Computing Static Single Assignment Form and the Control Dependence Graph," *ACM Transactions on Programming Languages and Systems*, vol. 13, No. 4, Oct., 1991, pp. 451-490.

Wilson et al., Efficient Context Sensitive Pointer Analysis for C Programs, *Proceedings of the SIGPLAN '95 Conference on Programming Language Design and Implementation*, Jun., 1995, pp. 1-12.

Wolfe, "Beyond Induction Variables," *Proceedings of the SIGPLAN '92 Conference on Programming Language Design and Implementation*, Jun., 1992, pp. 162-174.

Ruf, "Context-Insensitive Alias Analysis Reconsidered," *Proceedings of the SIGPLAN '95 Conference on Programming Language Design and Implementation*, Jun., 1995, pp. 13-22.

(List continued on next page.)

*Primary Examiner*—Alvin E. Oberley
*Assistant Examiner*—Kakali Chaki
*Attorney, Agent, or Firm*—Sterne, Kessler, Goldstein & Fox, P.L.L.C.

[57] ABSTRACT

A system and method for an optimizer of a compilation suite for representing aliases and indirect memory operations in static single assignment (SSA) during compilation of a program having one or more basic blocks of source code. The optimizer converts all scalar variables of said program to SSA form, wherein said SSA form includes a plurality of variable versions, zero or more occurrences of a $\chi$ function, zero or more occurences of a $\phi$ function, and zero or more occurrences of a $\mu$ function. The $\chi$ function, $\phi$ function, and $\mu$ function are inserted for the variable versions. The optimizer also determines whether a variable version can be renamed to a zero version, and upon such a determination, the optimizer renames the variable version to a zero version. The optimizer further converts all indirect variables of a program to SSA form, wherein the SSA form includes a plurality of virtual variable versions such that a virtual variable is assigned to an indirect variable, zero or more occurrences of a $\chi$ function, zero or more occurences of a $\phi$ function, and zero or more occurrences of a $\mu$ function. The $\chi$ function, $\phi$ function, and $\mu$ function are inserted for the virtual variables. The optimizer hashes a unique value number and creates a corresponding hash table entry for each variable version and each virtual variable remaining after renaming all zero versions. The optimizer also applies global value numbering to each basic block of the program.

3 Claims, 9 Drawing Sheets

OTHER PUBLICATIONS

Steensgaard, "Sparse Functional Stores for Imperative Programs," *Proceedings of the SIGPLAN '95 Workshop on Intermediate Representations*, Jan., 1995. pp. 62–70.

Wegman et al., "Constant Propagation with Conditional Branches," *ACM Transactions on Programming Languages and Systems*, Apr. 1991. pp. 181–210.

Cocke et al., *Programming Languages and Their Compilers*, Courant Institute of Mathematical Sciences, New York University, Apr., 1970. pp. 320–334.

Cytron et al., "Efficient Accommodation of May–alias Information in SSA Form," *Proceedings of the SIGPLAN '93 Conference on Programming Language Design and Implementation*, Jun., 1993. pp. 36–45.

Rosen et al., "Global Value Numbers and Redundant Computation," *Conference Record of the 15th ACM Symposium on the Principles of Programming Languages*, Jan., 1988. pp. 12–27.

Chow et al., "Effective Representation of Aliases and Indirect Memory Operations in SSA Form," *Compiler Construction, 6th International Conference*, Apr., 1996. pp. 253–267.

Chow, F., "A Portable Machine–independent Global Optimizer–Design and Measurements," *Ph.D. Theis and Technical Report 83–254*, Computer System Lab, Stanford University, Dec., 1983. pp. 1–172.

Click, C., "Global Code Motion Global Value Numbering," *Proceedings of the SIGPLAN '95 Conference on Programming Language and Implementation*, Jun., 1995. pp. 246–257.

Alpern et al., "Detecting Equality of Variables in Programs," *Conference Record of the 15th ACM Symposium on the Principles of Programming Languages*, Jan., 1988. pp. 1–11.

Chase et al., "Analysis of Pointers and Structures," *Proceedings of the SIGPLAN '90 Conference on Programming Language Design and Implementation*, Jun., 1990. pp. 296–310.

Choi et al., "Efficient Flow–Sensitive Interprocedural Computation of Pointer–Induced Aliases and Side Effects," *Conference Record of the 20th ACM Symposium on the Principles of Programming Languages*, Jan., 1993. 232–245.

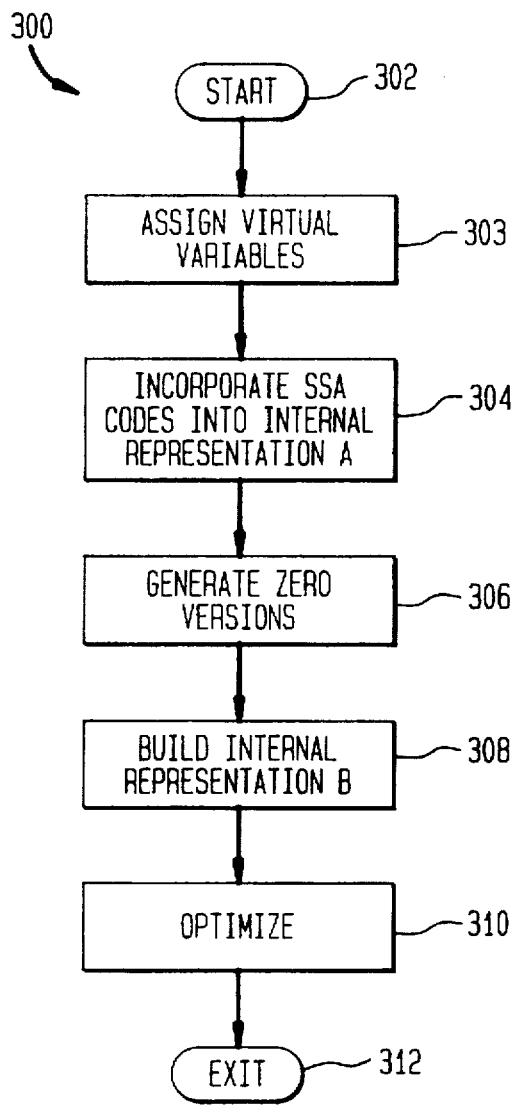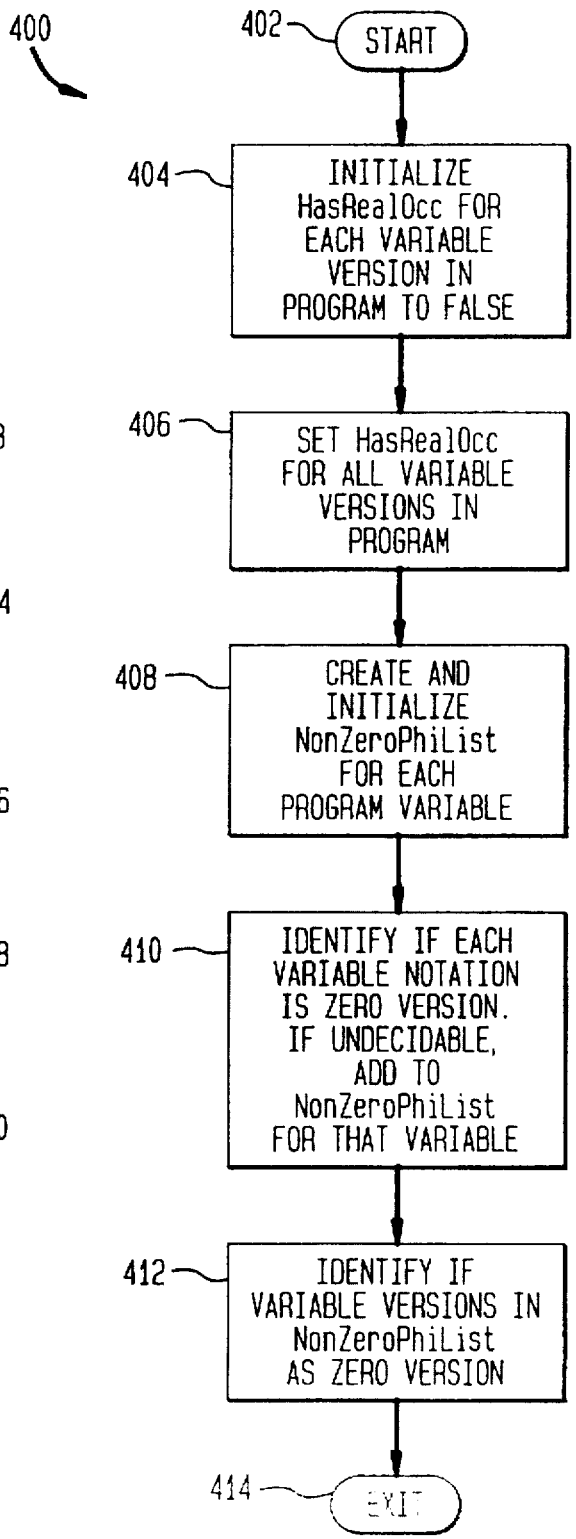

SYSTEM AND METHOD TO EFFICIENTLY REPRESENT ALIASES AND INDIRECT MEMORY OPERATIONS IN STATIC SINGLE ASSIGNMENT FORM DURING COMPILATION

BACKGROUND OF THE INVENTION

1. Field of the Invention

This invention relates to computer software compilers, and more specifically to a computer software compiler representing aliases and indirect memory operations in static single assignment form.

2. Related Art

Static Single Assignment (SSA) form is a well-known, popular and efficient representation used by compilers for performing analyses and optimizations involving scalar variables. Effective algorithms based on SSA have been developed to perform constant propagation, redundant computation detection, dead code elimination, induction variable recognition, and others.

Contemporary compilers, however, only use SSA for direct memory operations, i.e., accesses to scalar variables, in a program. When applied to indirect memory operations, including the use of arrays and accesses to memory locations through pointers, the representation is not straight forward, and results in added complexities in the optimization algorithms that operate on the representation. This has prevented SSA from being widely used in production compilers.

To better understand the invention, it is useful to describe some additional terminology relating to SSA. During compilation, a source program is translated to an intermediate representation in which expressions are represented in tree form. The expression trees are associated with statements that use their computed results.

In SSA form, each definition of a variable is given a unique version, and different versions of the same variable can be regarded as different program variables. Each use of a variable version can only refer to a single reaching definition. When several definitions of a variable, $a_1, a_2, \ldots, a_m$, reach a merging node in the control flow graph of the program, a $\phi$ function assignment statement, $a_n = \phi(a_1, a_2, \ldots, a_m)$, is inserted to merge them into the definition of a new variable version $a_n$. Thus, the semantics of single reaching definitions is maintained. This introduction of a new variable version as the result of $\phi$ factors use-def edges over merging nodes, thereby reducing the total number of use-def edges required. As a result, the use-def chain of each variable can be provided in a compact form by trivially allowing each variable to point to its single definition.

One important property in SSA form is that each definition must dominate all its uses in the control flow graph of the program. Another important property in SSA form is that identical versions of the same variable must have the same value.

Aliasing of a scalar variable occurs in one of five conditions: when its storage location partially overlaps another variable, when it is pointed to by a pointer used in indirect memory operations, when its address is passed in a procedure call, or when it is a non-local variable that can be accessed from another procedure in a call or return, or when exceptions are raised. Techniques have been developed to analyze pointers both intra-procedurally and inter-procedurally to provide more accurate information on what is affected by them so as to limit their ill effects on program optimizations.

To characterize the effects of aliasing, SAA distinguishes between two types of definitions of a variable: MustDef and MayDef. Because a MustDef must define the variable, it blocks the references of previous definitions from that point on. A MayDef only potentially redefines the variable, and so does not prevent definitions of the same variable from being referenced later in the program. On the use side, in addition to real uses of the variable, there are places in the program where there are potential references to the variable that need to be taken into account in analyzing the program. We call these potential references MayUse.

To accommodate the MayDefs, SSA edges for the same variable are factored over its MayDefs. This is sometimes referred to as location-factored SSA form. This effect is modeled by introducing the $\chi$ assignment operator in the SSA representation. $\chi$ links up the use-def edges through MayDefs. The operand of $\chi$ is the last version of the variable, and its result is the version after the potential definition. Thus, if variable i may be modified, the code is annotated with $i_2 = \chi(i_1)$, where $i_1$ is the current version of the variable.

To model MayUses, the $\mu$ operator is modeled in our SSA representation. $\mu$ takes as its operand the version of the variable that may be referenced, and produces no result. Thus, if variable i may be referenced, the code is annotated with $\mu(i_1)$, where $i_1$ is the current version of the variable.

In the compiler's internal representation, expressions cannot have side effects. Memory locations can only be modified by statements, which include indirect and direct store statements and calls. Thus, $\chi$ can only be associated with store and call statements. $\mu$ is associated with any dereferencing operation, like the unary operator * in C, which can happen within an expression. Thus, $\mu$ arises at both statements and expressions. Return statements can also be marked with $\mu$ for non-local variables to represent their liveness at function exits. Separating MayDef and MayUse allows precise modeling of the effects of calls. For example, a call that only references a variable will only cause a $\mu$ but no $\chi$. The $\mu$ takes effect just before the call, and the $\chi$ takes effect right after the call.

The following example describes of the use of $\mu$ and $\chi$, together with $\phi$, in SSA representation. In the example, function func uses but does not modify variable i.

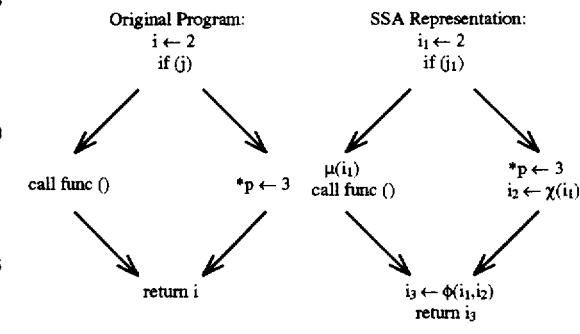

Example of $\mu$, $\chi$, and $\phi$

The inclusion of $\mu$ and $\chi$ in the SSA form does not impact the complexity of the algorithm that computes SSA form. A pre-pass of the compiler inserts unnamed $\mu$'s and $\chi$'s for the aliased variables at the points of aliases in the program. In applying the SSA creation algorithm, the operands of the $\mu$ and $\chi$ are treated as uses and the $\chi$'s are treated as additional assignments. The variables in the $\mu$ and $\chi$ are renamed together with the rest of the program variables.

Transformations performed on SSA form have to take aliasing into account in order to preserve the safety of the optimization. This means taking into account the μ and χ annotations. For example, in performing dead code elimination, a store can be deleted only if the store itself and all its associated χ's are not marked live.

As described above, the prior art shows how to use μ and χ to model use-def information when aliases occur in a program. The prior art, however, did not use any notation to annotate the MayDefs and MayUses. Even though use-def information is maintained, the number of versions multiplies because each χ introduces a new version and it may in turn cause new φ's to be inserted. Many of these versions have multiple possibly-defined values, and some of the defined values may also be unknown. As a result, it becomes relatively more expensive to represent programs in SSA form in the presence of aliases.

Furthermore, when applying the SSA form of the prior art to indirect memory constructs, the representation is not straight-forward. Due to this added complexity, no contemporary compiler has applied SSA forms to indirect memory operations. Traditionally, SSA has only been used with scalar variables, thereby, preventing the use of SSA in production compilers.

SUMMARY OF THE INVENTION

The present invention provides a system and method for a compiler to reduce the overhead in SSA representation in the presence of aliases. The present invention introduces the μ and χ notations to go with the φ notation. Using this notation combination, the present invention prevents the explosion in the number of SSA variable versions in the presence of aliases through the implementation of zero versions. A zero version of a variable has no real occurrence and whose values come from at least one potential redefinition of the variable with zero or more intervening potential references to the variable.

The present invention also provides a technique for representing indirect memory operations, together with ordinary scalar variables, in SSA form. More specifically, the present invention implements the concept of virtual variables for modeling indirect memory operations as scalars. Virtual variables are used to derive identical or distinct versions for indirect memory operations, effectively putting them in SSA form together with the scalar variables. This SSA representation in turn reduces the cost of analyzing the scalar variables that have aliases by taking advantage of the versioning applied to the indirect memory operations aliased with the scalar variables.

The present invention then presents a technique for building a uniform SSA representation of all the scalar and indirect memory operations of the program based on global value numbering, which is called the Hashed SSA representation (HSSA). This technique automatically extends the various optimizations for scalars to indirect memory operations.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 3 is a control flow diagram representing the operation of an optimizer incorporating the features of the present invention;

FIG. 4 is a control flow diagram representing the operation of the zero versioning feature of the present invention;

DETAILED DESCRIPTION OF THE PREFERRED EMBODIMENTS

1. Overview

Figure 1:
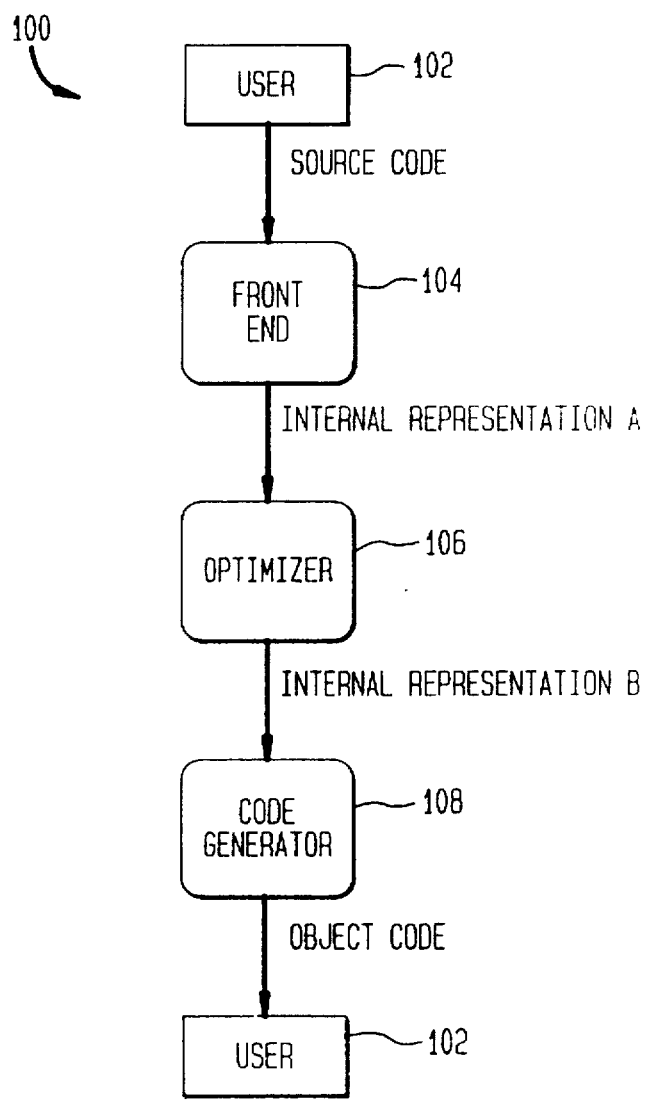
FIG. 1 is a data flow diagram of a compiler.

The present invention is directed to a computer software compiler 100. The data flow diagram of FIG. 1 illustrates the components of a compiler 100, the external interfaces of the compiler 100, and the flow of data between the compiler components. The components of a compiler 100 include: a front end 104, optimizer 106, and code generator 108.

In operation, a user 102 submits source code to the compiler 100. The front end 104 component of the compiler 100 receives the source code and produces a first internal representation, called internal representation A for convenience purpose only.

The optimizer 106 inputs and analyzes the internal representation A. Based on its analysis, the optimizer 106 restructures portions of the internal representation A, thereby making it more efficient code. The resulting efficient code is called internal representation B for convenience purpose only.

The code generator 108 inputs the internal representation B and generates object code. The object code is then available to the user to link and load, thereby creating an executable image of the source code for running on a computer system.

The preferred embodiment of the present invention is directed to the optimizer 106. In the preferred embodiment, the optimizer 106 makes two passes on the internal representation A. In a first pass, the optimizer 106 generates SSA codes and puts the internal representation A in SSA form. The SSA codes and form contain the techniques of the present invention including the use of zero versions and virtual variables. Zero versions and virtual variables are described in greater detail below. In a second pass, the optimizer 106 performs standard optimization in a well-known manner. The preferred embodiment of the present invention is described in these terms for convenience purpose only. It would be readily apparent to one skilled in the relevant art to apply the techniques of the present invention to an alternate optimizer.

2. Host System of the Preferred Embodiment

Figure 2:
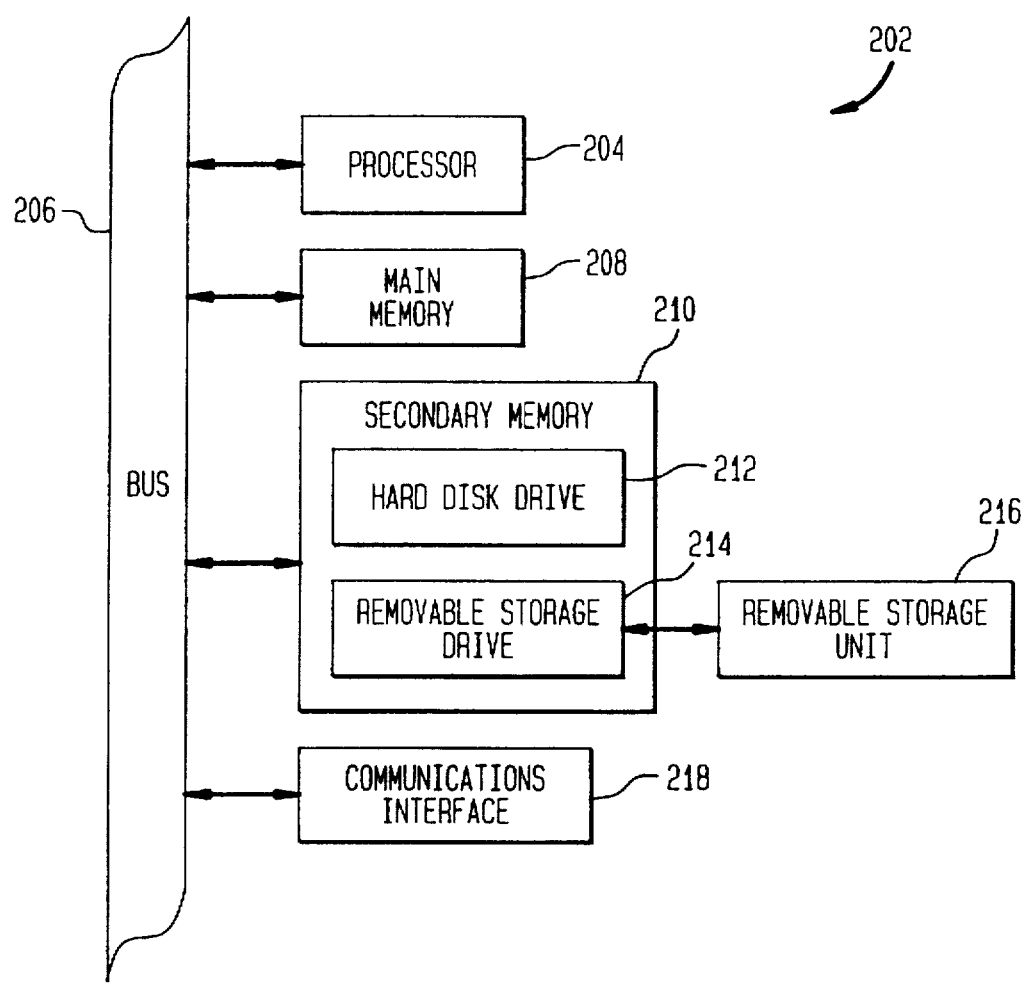
FIG. 2 is a block diagram illustrating an exemplary computer system for executing the present invention.

The chosen embodiment of the present invention is computer software executing within a computer system. FIG. 2 shows an exemplary computer system. The computer system 202 includes one or more processors, such as a processor 204. The processor 204 is connected to a communication bus 206.

The computer system 202 also includes a main memory 208, preferably random access memory (RAM), and a secondary memory 210. The secondary memory 210 includes, for example, a hard disk drive 212 and/or a removable storage drive 214, representing a floppy disk drive, a magnetic tape drive, a compact disk drive, a compact disk drive, a program cartridge and cartridge interface (such as that found in video game devices), a removable memory chip (such as EPROM, or PROM), etc. which is read by and written to by a removable storage unit 216. Removable storage unit 216, also called a program storage device or a computer program product, represents a floppy disk, magnetic tape, compact disk, etc. As will be appreciated, the removable storage unit 216 includes a computer usable storage medium having stored therein computer software and/or data. The removable storage drive 214 reads from and/or writes to a removable storage unit 116 in a well known manner.

The computer system 202 may also include other similar means for allowing computer programs or other instructions to be loaded. Such means can include, for example, a communications interface 218. Communications interface 218 allows software and data to be transferred between computer system 202 and external devices. Examples of communications interface 218 can include a modem, a network interface (such as an Ethernet card), a communications port, etc. Software and data transferred via communications interface 218 are in the form of signals which can be electronic, electromagnetic, optical or other signals capable of being received by communications interface 218.

In this document, the term "computer program product" is used to generally refer to removable storage unit 216, a hard disk installed in hard disk drive 212, and signals transferred via communications interface 218. These computer program products are means for providing software to a computer system 202.

In an embodiment where the invention is implemented using software, the software may be stored in main memory 208, or in a computer program product and loaded into computer system 202 using removable storage drive 214, hard disk drive 212, or communications interface 218. The software, when executed by the processor 204, causes the processor 204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to execute on a computer system 202 in which the processor 204 is any MIPS processor. The preferred embodiment of the present invention is implemented in software, and more specifically, is written in the programming language C++. Furthermore, the preferred embodiment is incorporated into the production global Optimizer (OPT) which is a main component of the compiler suite MIPSpro Release 7.0 targeted for MIPS 10000-based systems. MIPSpro is available from Silicon Graphics, Incorporated and is directed to compiling programming languages such as C, C++, and FORTRAN. The preferred embodiment is described in these terms for convenience purpose only. Other comparable computer systems 202, processors 204, and programming languages could alternatively be used.

3. Control Flow for an Optimizer Incorporating the Present Invention

FIG. 3 illustrates the steps of an optimizer 106 that incorporates SSA form with the present invention's techniques for zero versioning and indirect memory operations. After receiving control in step 302, the optimizer 106 immediately proceeds to step 303 in which the optimizer 106 assigns virtual variables to the indirect memory operators in the program. The optimizer 106 continues to step 304. In step 304, the optimizer 106 incorporates SSA codes into the internal representation A and generates SSA form.

Proceeding to step 306, the optimizer 106 analyzes the SSA form and generates zero versions. Zero versions are described in greater detail below. After zero versions are generated, the optimizer 106 continues to step 308 and builds the internal representation B. When handling indirect memory operations, the optimizer 106 performs global value numbering when performing step 308. Global value numbering is described in greater detail below.

Proceeding to step 310, the optimizer 106 optimizes the internal representation B in a well-known manner. The mechanism of the present invention for handling SSA form with indirect memory operations directly effects the performance of the optimizer 106 in step 310. An improvement in optimization reduces compilation time. The compiled program also runs faster when executed. When optimization is complete, the optimizer 106 proceeds to step 312 and exits its processing.

4. SSA with Zero Versioning

Occurrences of variables in the original program before conversion to SSA form are called real occurrences. Therefore, in SSA form, variable occurrences in $\phi$, $\mu$ and $\chi$ functions are not real occurrences. The variable versions that have no real occurrence do not directly affect the optimized output of the program once the program is converted back to ordinary form. They do, however, indirectly affect the optimizations that follow use-def chains that pass through $\phi$, $\mu$ and $\chi$. Once identified, these variable versions that have no real occurrence can be aggregately represented by a special version of the variable, thus reducing the number of versions of the variable that need to be represented, with only a slight impact on the quality of the optimized output. Version 0 is assigned to this special version, thereby being called the zero version. In summary, zero versions are versions of variables that have no real occurrence and whose values come from at least one $\chi$ with zero or more intervening $\phi$'s.

Alternatively, zero versions can be defined recursively as follows:

(i). The left hand side of a $\chi$ is a zero version if it has no real occurrence; and (ii). If an operand of a $\phi$ is a zero version, the result of the $\phi$ is a zero version if it has no real occurrence.

Zero versioning thus characterizes versions with no real occurrence whose values are affected by aliased stores. Since their values are not fixed, they are not assigned unique versions to them and do not represent their use-def relationships.

FIG. 4 is a control flow diagram illustrating the algorithm of computing zero versions. The algorithm requires that all variables have been renamed in the process of building the SSA form in step 304 of FIG. 3. The algorithm further assumes that def-use information, which is more expensive than use-def information under SSA, is not maintained, and only use-def information is available. In the alternative, if def-use information is present, a more efficient algorithm is possible. The algorithm of FIG. 4 identifies the versions of variables that can be made a zero version and resets their versions to zero.

Processing starts at step 402 and immediately proceeds to step 404. In step 404, the optimizer 106 initializes to false a HasRealOcc flag for each variable version in the program created by SSA. Proceeding to step 406, the optimizer 106 makes a first pass over the internal representation A of the program. The optimizer 106 analyzes each variable version in the program and determines whether the variable version has a real occurrence. If the variable version has a real occurrence, the optimizer 106 sets the HasRealOcc flag associated with the variable version to true. Step 406 is described in greater detail below. In the alternative, the pass made by the optimizer 106 to set the HasRealOcc flag in step 406 can coincide with another pass over the program, such as with a pass that performs an unrelated optimization, e.g. dead store elimination. Proceeding from step 406, the optimizer enters step 408.

In step 408, the optimizer 106 creates and initializes to empty a NonZeroPhiList for each program variable. Continuing to step 410, the optimizer 106 iterates through all variable versions in the program and generates zero versions when appropriate. Step 410 is described in greater detail below. Proceeding to step 412, the optimizer 106 then iterates through all program variables and generates zero versions when appropriate. More specifically, the optimizer 106 iterates through each program variable's NonZeroPhiList until its NonZeroPhiList no longer changes. Step 412 is described in greater detail below. After generating all zero versions, the optimizer 106 proceeds to step 414 and exits processing.

Figure 5:
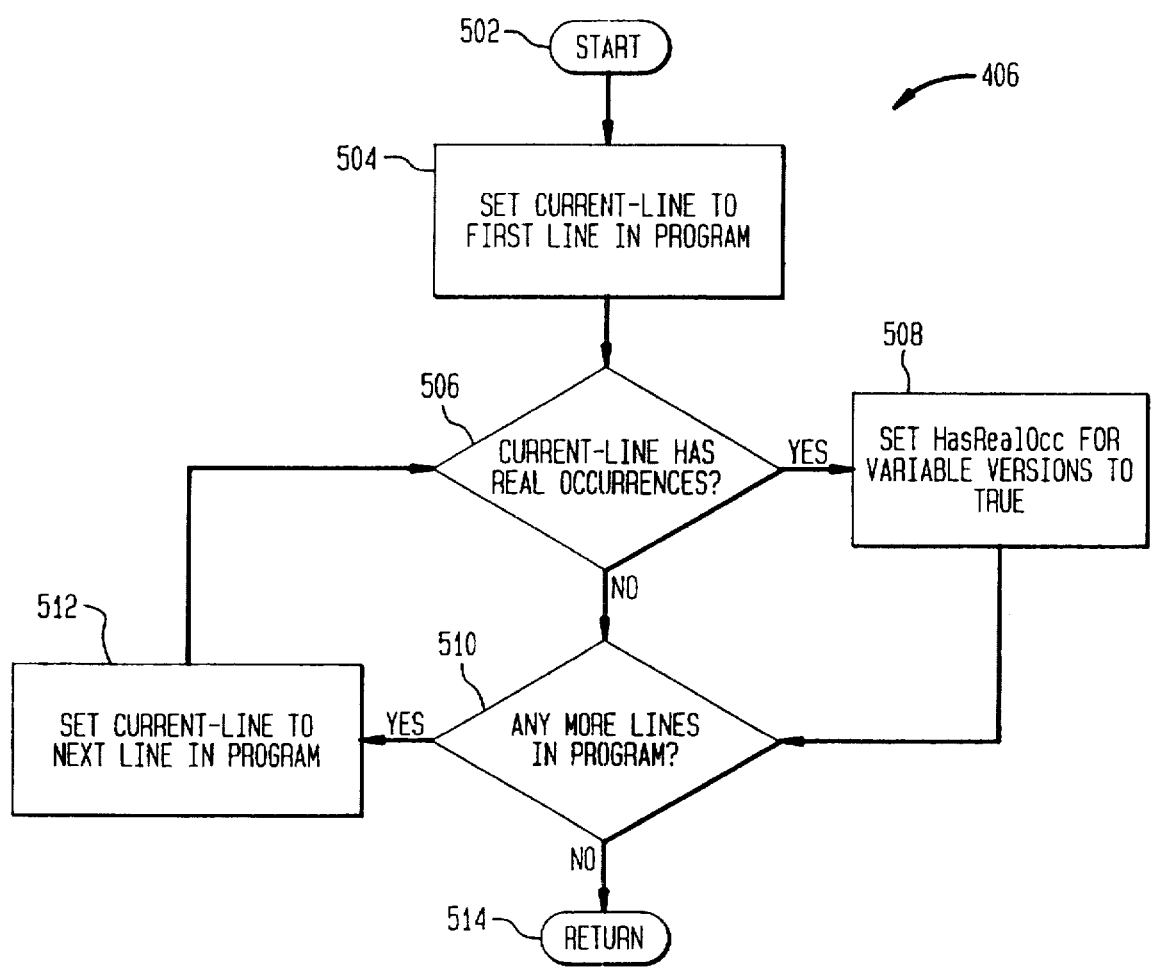
FIG. 5 is a control flow diagram representing the operation of setting the HasRealOcc variable for all variable versions in a program.

FIG. 5 illustrates the control flow of step 406 for setting the HasRealOcc flag for all variable versions in the program. Processing starts at step 502 and immediately proceeds to step 504. In step 504, the optimizer 106 sets a current-line variable to point to the first line in the internal representation A of the program. The optimizer 106 then proceeds to step 506.

In step 506, the optimizer 106 determines whether the current-line contains real occurrences. If the current-line contains real occurrences, the optimizer 106 continues to step 508. In step 508, the optimizer 106 sets the HasRealOcc flags associated with the variable versions in the current-line to true and then proceeds to step 510.

Referring again to step 506, if the optimizer 106 determines that the current-line does not contain a real occurrence, the optimizer 106 continues to step 510.

In step 510, the optimizer 106 determines whether there are any more lines in the internal representation A of the program that need to be processed. If there are more lines to process, the optimizer 106 continues to step 512. In step 512, the optimizer 106 sets the current-line to the next line in the program. Then, the optimizer 106 returns to step 506 as described above.

Referring again to step 510, if the optimizer 106 determines that there are not any more lines remaining in the program for processing, the optimizer 106 continues to step 514. In step 514, the optimizer 106 returns control to step 406 in FIG. 4 and proceeds to step 408.

Figure 6:
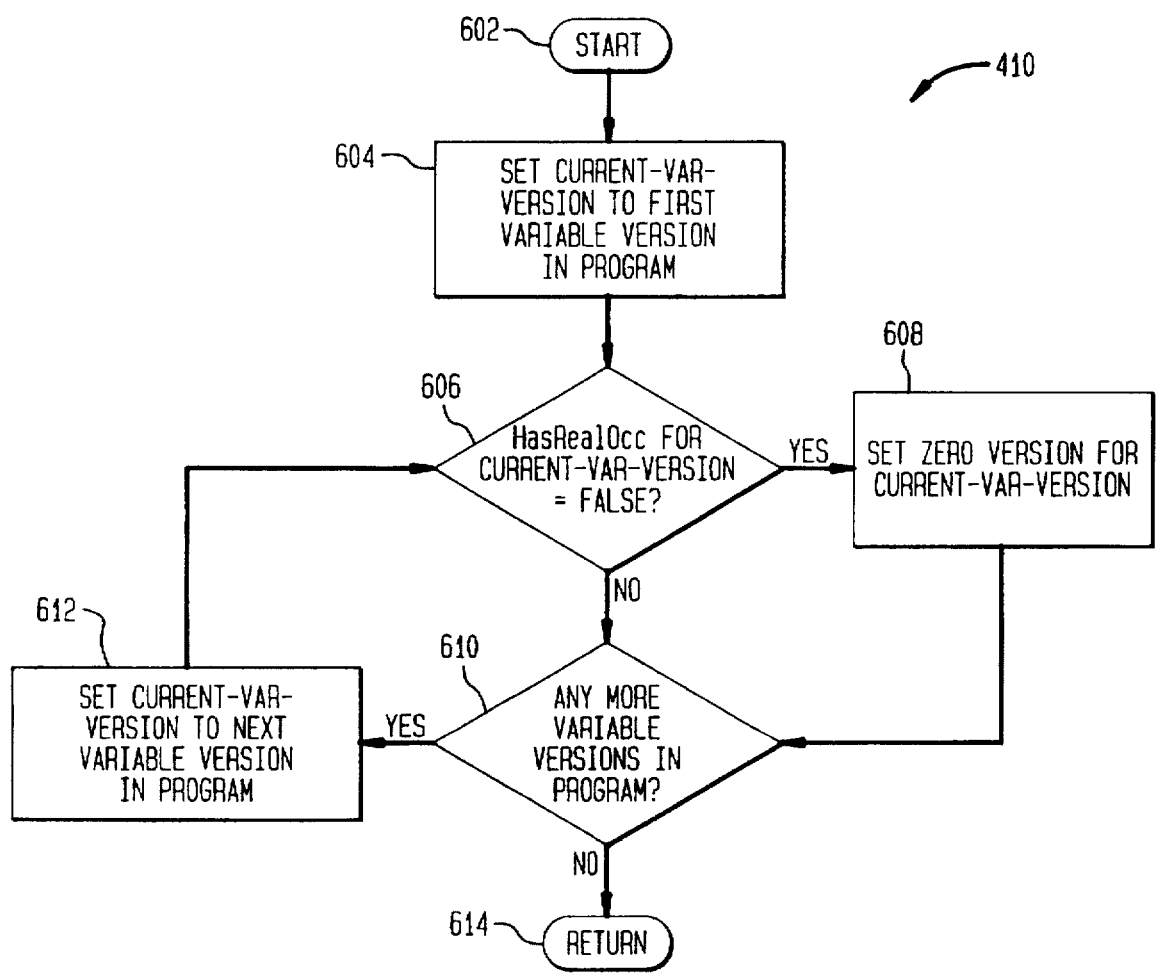
FIG. 6 is a control flow diagram representing the operation of generating zero versions for all variable versions in a program.

FIG. 6 illustrates the control flow of step 410 for generating zero versions for all variable versions in the program. Processing starts at step 602 and immediately proceeds to step 604. In step 604, the optimizer 106 sets the current-var-version variable to the first variable version in the SSA form of the program. The optimizer 106 then proceeds to step 606 and determines whether the HasRealOcc flag associated with the current-var-version is false. If the HasRealOcc flag for the current-var-version is false, the optimizer 106 continues to step 608. In step 608, the optimizer 106 sets the zero version for the current-var-version. Step 608 is described in greater detail below. After setting the zero version in step 608, the optimizer 106 proceeds to step 610.

Referring again to step 606, if the optimizer 106 determines that the HasRealOcc flag associated with the current-var-version is not false, but rather, is true, the optimizer 106 continues to step 610.

In step 610, the optimizer 106 determines whether there are any more variable versions in the SSA form of the program to process. If there are more variable versions to process, the optimizer 106 continues to step 612. In step 612, the optimizer 106 sets the current-var-version to point to the next variable version in the program. Then, the optimizer 106 returns to step 606 as described above.

Referring again to step 610, if the optimizer 106 determines that there are not any more variable versions remaining in the program for processing, the optimizer 106 continues to step 614. In step 614, the optimizer 106 returns control to step 410 in FIG. 4 and proceeds to step 412.

Figure 7:
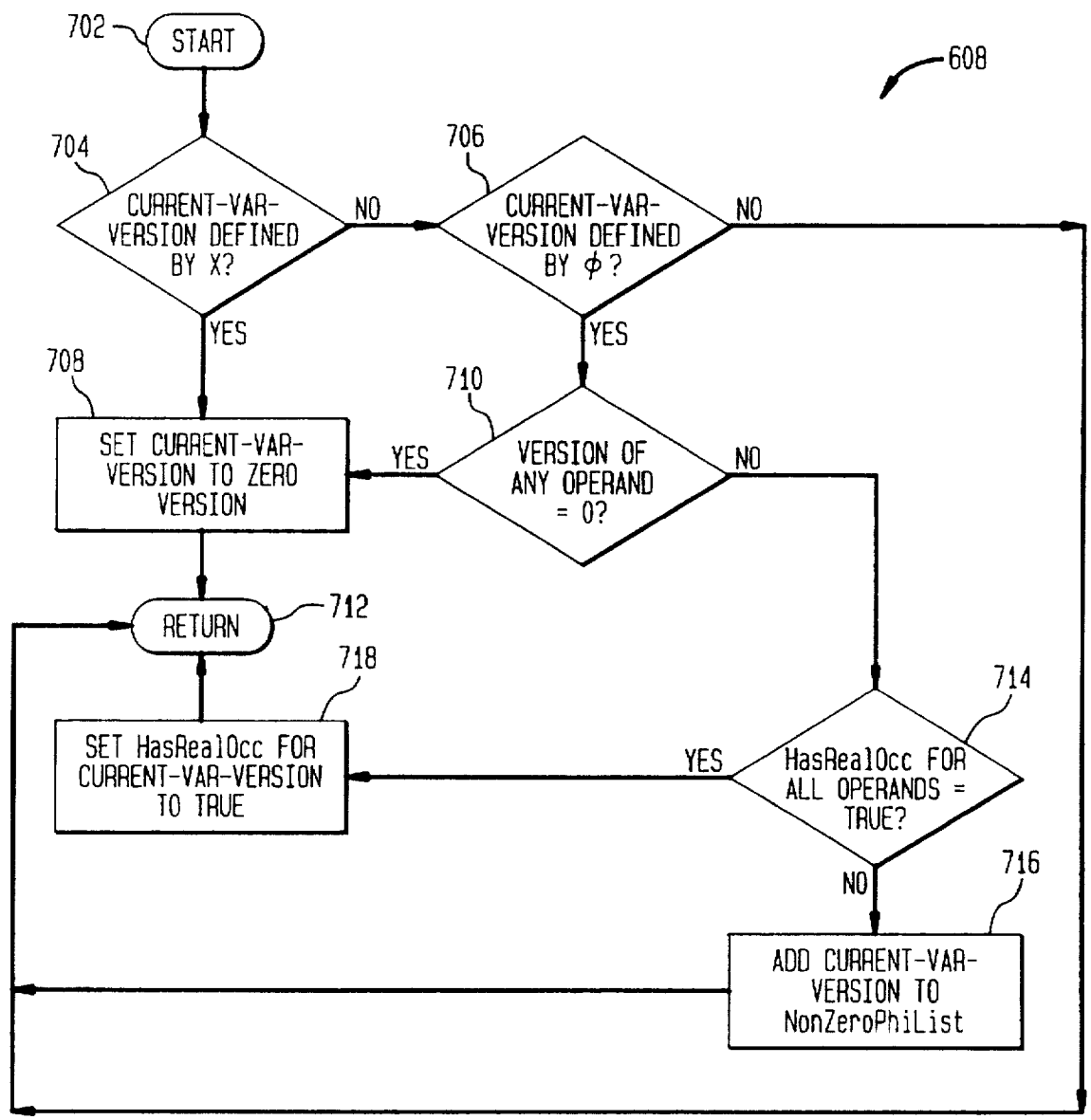
FIG. 7 is a control flow diagram representing the operation of setting a zero version for a current-var-version.

FIG. 7 illustrates the control flow of step 608 for setting the zero version for the current-var-version. Processing starts at step 702 and immediately proceeds to step 704. In step 704, the optimizer 106 determines whether the current-var-version is defined by the $\chi$ function. If the current-var-version is defined by the $\chi$ function, the optimizer 106 continues to step 708. In step 708, the optimizer 106 sets the current-var-version to the zero version. The optimizer 106 then proceeds to step 712 and returns control to step 608 in FIG. 6 and proceeds to step 610.

Referring again to step 704, if the optimizer 106 determines that the current-var-version is not defined by the $\chi$ function, the optimizer 106 continues to step 706. In step 706, the optimizer determines whether the current-var-version is defined by the $\phi$ function. If the current-var-version is defined by the $\phi$ function, the optimizer 106 continues to step 710. In step 710, the optimizer determines whether the version of one of the operands of the $\phi$ function is zero. If one of the operands is a zero version, the optimizer 106 continues to step 708, as described above, and sets the current-var-version to a zero version.

Referring again to step 710, if the optimizer 106 determined that none of the operands of the $\phi$ function is a zero version, the optimizer 106 continues to step 714. In step 714, the optimizer 106 determines whether the HasRealOcc flag for each of the operands of the $\phi$ function is true. If the all of the operands' HasRealOcc flags are true, the optimizer 106 continues to step 718. In step 718, the optimizer 106 sets the HasRealOcc flag for the current-var-version to true. Proceeding to step 712, the optimizer 106 returns control to step 608 in FIG. 6 and proceeds to step 610.

Referring again to step 714, if the optimizer 106 determines that the HasRealOcc flags for all of the operands of the $\phi$ function are not true, the optimizer 106 continues to step 716. In step 716, the optimizer 106 adds the current-var-version to the NonZeroPhiList associated with the program variable of the current-var-version. Proceeding from step 716 to step 712, the optimizer returns control to step 608 in FIG. 6 and proceeds to step 610.

Referring again to step 706, if the optimizer 106 determines that the current-var-version is not defined by the $\phi$ function, the optimizer 106 continues to step 712. In step 712, the optimizer 106 returns control to step 608 in FIG. 6 and proceeds to step 610.

Figure 8:
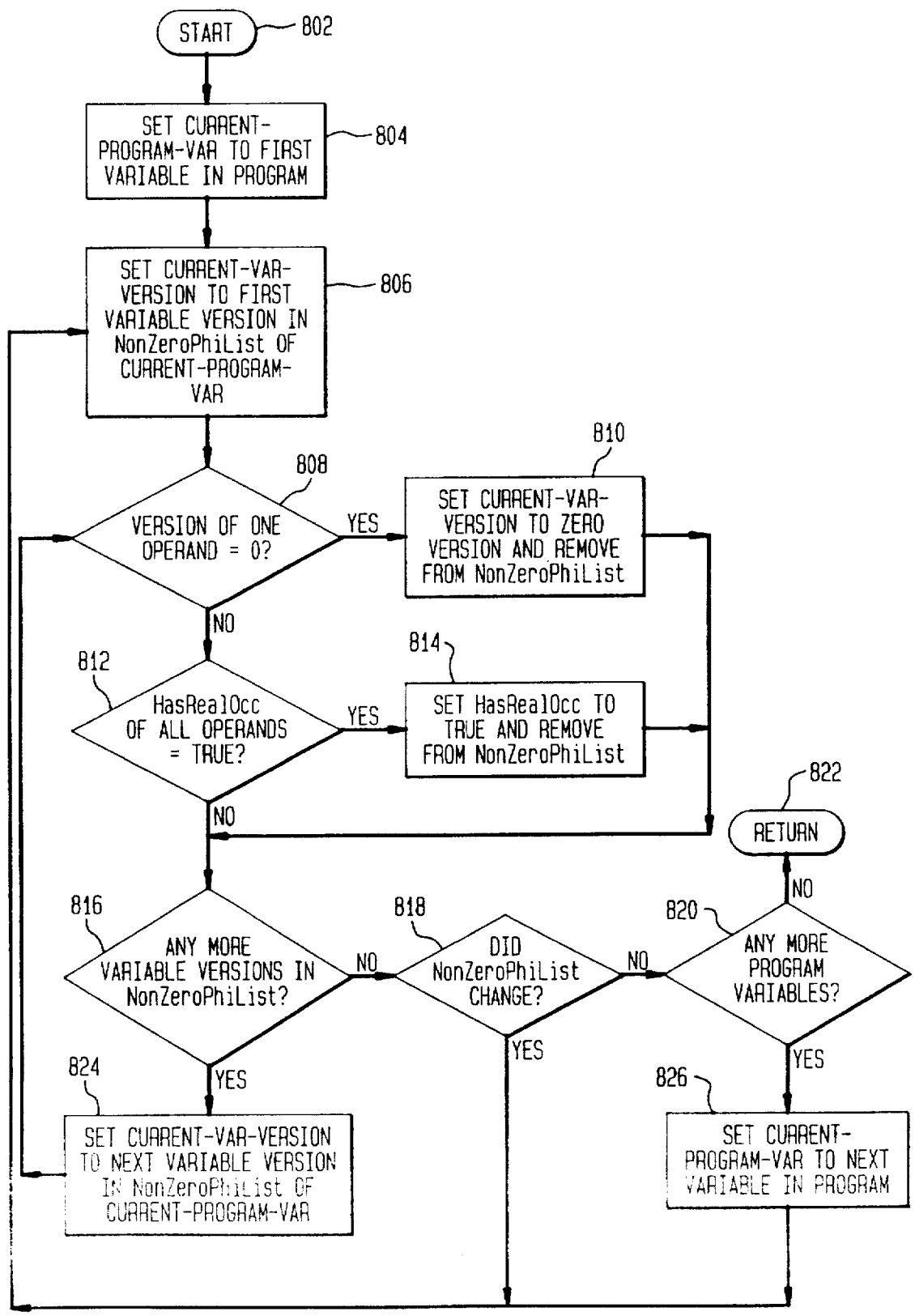
FIG. 8 is a control flow diagram representing the operation of identifying if each variable version in the NonZeroPhiList is a zero version.

FIG. 8 illustrates the control flow of step 412 for identifying if each variable version in the NonZeroPhiList is a zero version. Processing starts at step 802 and immediately proceeds to step 804. In step 804, the optimizer 106 sets the current-program-var variable to the first variable in the program. The optimizer 106 then proceeds to step 806. In step 806, the optimizer 106 sets the current-var-version to the first version of the current-program-var in the NonZeroPhiList associated with the current-program-var.

Proceeding to step 808, the optimizer determines whether the version of one of the operands of the φ function is zero. If one of the operands is a zero version, the optimizer 106 continues to step 810. In step 810, the optimizer 106 sets the current-var-version to a zero version and removes the current-var-version from the NonZeroPhiList associated with the current-program-var. The optimizer 106 then proceeds to step 816 which is described below.

Referring again to step 808, if the optimizer 106 determines that none of the operands of the φ function is a zero version, the optimizer 106 continues to step 812. In step 812, the optimizer 106 determines whether the HasRealOcc flags for all of the operands of the φ function are true. If all of the HasRealOcc flags are true, the optimizer 106 continues to step 814. In step 814, the optimizer 106 sets the HasRealOcc flag associated with the current-var-version to true and removes the current-var-version from the NonZeroPhiList associated with the current-program-var. The optimizer 106 then proceeds to step 816 which is described below.

Referring again to step 812, if the optimizer 106 determines that all of the HasRealOcc flags for the operands of the φ function are not true, the optimizer 106 continues to step 816.

In step 816, the optimizer 106 determines whether there are any more variable versions in the NonZeroPhiList associated with the current-program-var to process. If there are more variable versions to process, the optimizer 106 continues to step 824. In step 824, the optimizer 106 sets the current-var-version to the next variable version in the NonZeroPhiList associated with the current-program-var. The optimizer 106 then returns to step 808 as described above.

Referring again to step 816, if the optimizer 106 determines that there are not any more variable versions in the NonZeroPhiList to process, the optimizer 106 continues to step 818. In step 818, the optimizer 106 determines whether the NonZeroPhiList associated with the current-program-var changed during the last iteration through its entries. If the NonZeroPhiList did change, the optimizer 106 returns to step 806 to conduct another iteration through the variable versions contained in the NonZeroPhiList.

Referring again to step 818, if the optimizer 106 determines that the NonZeroPhiList did not change during the last iteration though the variable versions contained in the NonZeroPhiList, the optimizer 106 continues to step 820. In step 820, the optimizer 106 determines whether there are any more program variables to process. If there are more program variables to process, the optimizer 106 continues to step 826. In step 826, the optimizer 106 sets the current-program-var to the next variable in the program. Afterwhich, the optimizer 106 returns to step 806 as described above to iterate through the entries of the NonZeroPhiList associated with the new current-program-var.

Referring again to step 820, if the optimizer 106 determines that there are no more program variables to process, the optimizer 106 proceeds to step 822. In step 822, the optimizer 106 returns control to step 412 in FIG. 4 and proceeds to step 414.

The first iteration through all the variable versions, as represented in FIG. 6, completely processes all variable versions except those that are the results of φ functions whose operands have not yet been processed. These are collected into a NonZeroPhiList. After the first iteration of FIG. 8, the versions still remaining in a NonZeroPhiList all have at least one operand defined by φ. The upper bound on the number of iterations in FIG. 8 corresponds to the longest chain of contiguous φ assignments for the variable in the program. When no more zero versions can be propagated through each φ, the algorithm terminates.

Because zero versions can have multiple assignments statistically, they do not have fixed or known values, therefore, two zero versions of the same variable cannot be assumed to be the same. The occurrences of a zero version breaks the use-def chain. Since the results of χ's have unknown values, zero versions do not affect the performance of optimizations that propagate known values, like constant propagation, because they cannot be propagated across points of MayDefs to the variables. Optimizations that operate on real occurrences, like equivalencing and redundancy detection, are also unaffected. In performing dead store elimination, zero versions have to be assumed live. Since zero versions can only have uses represented by μ's, the chance that stores associated with χ's to zero versions can be removed is small. However, it is possible that later optimizations delete the code that contains the μ's. Only in such situations would zero version prevent more dead store elimination.

Zero versions are created only when aliases occur. The present invention regarding zero versions does not affect optimization when there is no aliasing. Zero versioning also does not prevent the SSA form from being used as a representation for various program transformations, because it is not applied to real occurrences. When aliases are prevalent in the program, zero versioning prevents the number of variable versions in the SSA form from exploding. In the following example, since a is a global variable, it has a μ at the return statement. The present invention eliminates versions $a_2$ and $a_3$ by converting them to version 0.

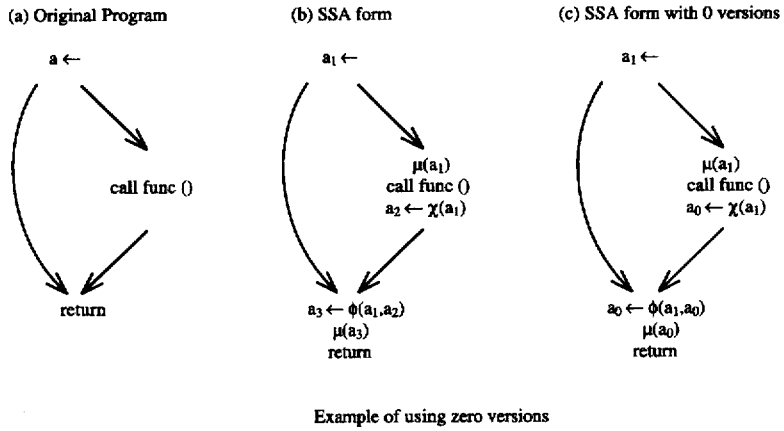

Example of using zero versions

5. SSA for Indirect Memory Operations

In an indirect memory operation, the memory location referenced depends on the values of the variables involved in the computation specified by the address expression. The following are examples of indirect memory operations and their tree representation.

| Source construct: | *p | *(p + 1) | **p | p->next | a[i] |

Tree representation:

```
    *        *        *        *        *
    |        |        |        |        |
    p        +        *        +        +
            / \       |       / \      / \
           p   1      p      p   8   &a   I
                     / \
                    p   1
```

Indirect memory operations are either indirect loads or indirect stores. For convenience purpose, they are referred to as loads and stores to indirect variables, as opposed to scalar variables. Indirect variables are identified by the form of their address expressions. The C dereferencing operator * is used to denote indirection. Given an address expression <expr>, *<expr> represents a load of the indirect variable and *<expr>← represents a store to the indirect variable.

The same algorithm that computes SSA form for scalar variables can be applied to indirect variables, renaming them such that versions that statically have the same value get the same name. The difference is that each indirect variable is treated as separate indirect variables if the variables involved in their address expressions are not of identical versions. This is illustrated as follows, in which the two occurrences of *p are renamed to different versions. Though *p is not redefined between the two occurrences, p is redefined.

| Renaming Indirect Variables | |
|---|---|
| Original Program: | SSA Representation: |
| ... *p ... | ... (*p₁)₁ ... |
| p ← p + 1 | p₂ ← p₁ + 1 |
| ... *p ... | ... (*p₂)₂ ... |

One solution to solve the above problem is to apply the algorithm to compute SSA form multiple times to a program. The first application computes the versions for all scalar variables, the second application computes the versions for all indirect variables with one level of indirection, the third application computes the versions for all indirect variables with two levels of indirection, etc. Multiple invocations of the SSA computation algorithm, however, would be prohibitively expensive and not practical. The only advantage with this approach is that, in between each application, it is possible to improve on the alias analysis by taking advantage of the version, and thus, use-def information just computed in the address expression.

The present invention allows the computation of the SSA form for all scalar and indirect variables in one pass. For this purpose, the present invention introduces virtual variables to characterize indirect variables and includes them in computing the SSA form. The virtual variable of an indirect variable is an imaginary scalar variable that has identical alias characteristics as the indirect variable.

For all indirect variables that have similar alias behavior in the program, a unique virtual variable is assigned. The v superscripted with the indirect variable name is used to denote a virtual variable. Alias analysis is performed on the virtual variables together with the scalar variables. For virtual variables, alias analysis can additionally take into account the form of the address expression to determine when they are independent. For example, $v^{*p}$ and $v^{*(p+1)}$ do not alias with each other. The algorithm is then applied to compute SSA form for all the scalar and indirect variables of the program. Since each virtual variable aliases with its indirect variable, the resulting SSA representation must have each occurrence of an indirect variable annotated with μ or χ of its virtual variable. The use-def relationship in the virtual variable now represents the use-def relationship of its indirect variable. Each occurrence of a indirect variable can then be given the version number of the virtual variable that annotates it is the μ or χ, except that new versions need to be generated when the address expression contains different versions of variables. This is easily handled by regarding indirect variables, whose address expressions have been renamed differently, to be different indirect variables, even though they share the same virtual variable due to similar alias behavior. In the above example, after p has been renamed, $*p_1$ and $*p_2$ are regarded as different indirect variables. This causes different version numbers to be assigned to the *p's. $(*p_1)_1$ and $(*p_2)_2$, even though the version of the virtual variable $v^{*p}$ has not changed.

It is possible to cut down the number of virtual variables by making each virtual variables represent more indirect variables. This is referred to as assignment factoring. It has the effect of replacing multiple use-def chains belonging to different virtual variables with one use-def chain that has more nodes and thus versions of the virtual variable, at the expense of higher analysis cost while going up the use-def chain. In the extreme case, one virtual variable can be used to represent all indirect variables in the program. The following examples use different numbers of virtual variables in a program.

The present invention also builds a concise SSA representation of the entire program based on global value numbering (GVN), called Hashed SSA (HSSA) because of the use of hashing in value numbering. HSSA serves as the internal program representation of the optimizer 106, on which most optimizations are performed.

Conventional value numbering is a technique to recognize expressions that compute the same value. It uses a hash table to store all program expressions. Each entry in the hash table is either an operand (leaf) or an operator (internal) node. The hash table index of each entry corresponds to its unique value number. The value number of an internal node is a function of the operator and the value numbers of all its immediate operands. Any two nodes with the same value number must compute the same value. Value numbering yields a directed acylic graph (DAG) representation of the expressions in the program.

SSA for Indirects using different numbers of virtual variables

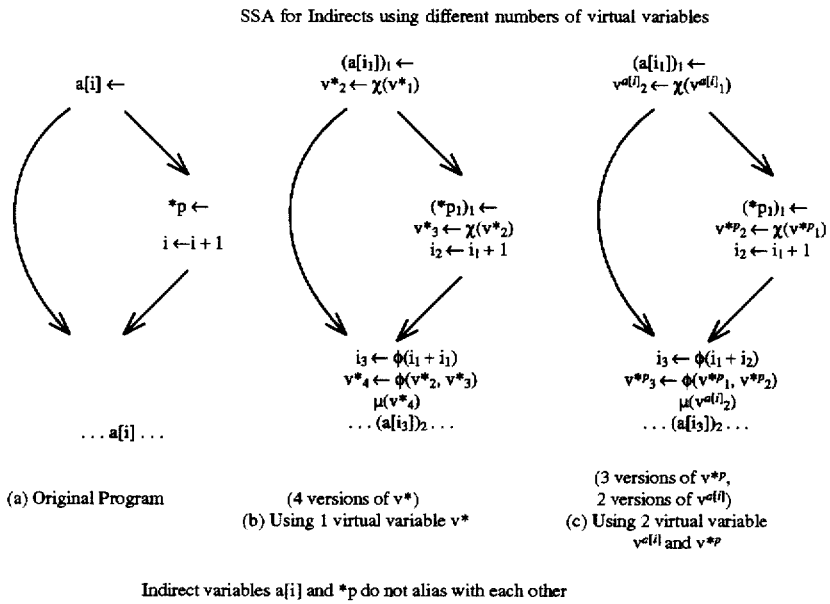

(a) Original Program (b) Using 1 virtual variable v*
(4 versions of v*)

(c) Using 2 virtual variable $v^{a[i]}$ and $v^{*p}$
(3 versions of $v^{*p}$, 2 versions of $v^{a[i]}$)

Indirect variables a[i] and *p do not alias with each other

In this example, $a[i_1]$ and $a[i_2]$ are determined to be different versions because of the different versions of i used in them, and are assigned versions 1 and 2 (shown as subscripts after the parentheses that enclose them) respectively. In part (b) above, when a single virtual variable v* is used for both a[i] and p, even though they do not alias with each other, the single use-def chain has to pass through the appearances of both of them, and is thus less accurate.

In practice, assignment factoring is not used among variables that do not alias among themselves, so that there is no additional cost of analyzing the alias relationship between different variables while traversing the use-def chains. For example, distinct virtual variables are assigned to a[i] and b[i] where arrays a and b do not overlap with each other. While traversing the use-def chains, the present invention looks for the presence of non-aliasing in indirects by analyzing their address expressions. For example, $a[i_1]$ does not alias with $a[i_1+1]$ even though they share the same virtual variable.

Zero versions, as described above, can also be applied to virtual variables, in which virtual variables appearing in the μ and χ next to their corresponding indirect variables are regarded as real occurrences. This also reduces the number of versions for virtual variables.

6. Global Value Numbering for Indirect Memory Operations

Without SSA form, value numbering can only be performed at the basic block level. With SSA, however, value numbering can be performed globally. The representation is more compact, because each variable version maps to a unique value number and occupies only one entry in the hash table, no matter how many times it occurs in the program. Expressions made up of variables with identical versions are represented just once in the hash table, regardless of where they are located in the control flow graph.

In conventional value numbering, when two indirect memory operations yield the same hash value, they may not be assigned the same value number because the memory locations may contain different values. In straight-line code, any potential modification to the memory location is detected by monitoring operations that affect memory while traversing the code. But with GVN, this method cannot be used because GVN is flow-insensitive. One possibility is to give up commonizing the indirect operators by always creating a new value number for each indirect operator. This approach, however, is undesirable, since it decreases the optimality and effectiveness of the GVN. Therefore, to solve this problem, the present invention applies the method described above of renaming indirect operations. During GVN, a value number is mapped to each unique version of indirect memory operations that has been determined.

As with conventional GVNs, the GVN of the present invention hashes expressions into the hash table bottom-up. However, the GVN of the present invention is in the form of expression trees, instead of triplets. Because the present invention does not use triplets, variables are distinct from operators. Statements are not value-numbered. Instead, they are linked together on a per-block basis to represent the execution flow of each basic block. The DAG structure provides use-def information cheaply and succinctly, via a single link from each variable node to its defining statement. The HSSA representation by default does not provide def-use chains.

There are five types of node in the HSSA representation of the present invention. Three of them are left nodes: const for constants, addr for addresses and var for variables. Type op represents general expression operators. Indirect variables are represented by nodes of type ivar. Type ivar is a hybrid between type var and type op. It is like type op because it has an expression associated with it. It is like type var because it represents memory locations. The ivar node corresponds to the C dereferencing operator *. Both var and ivar nodes have links to their defining statements.

Figure 9:
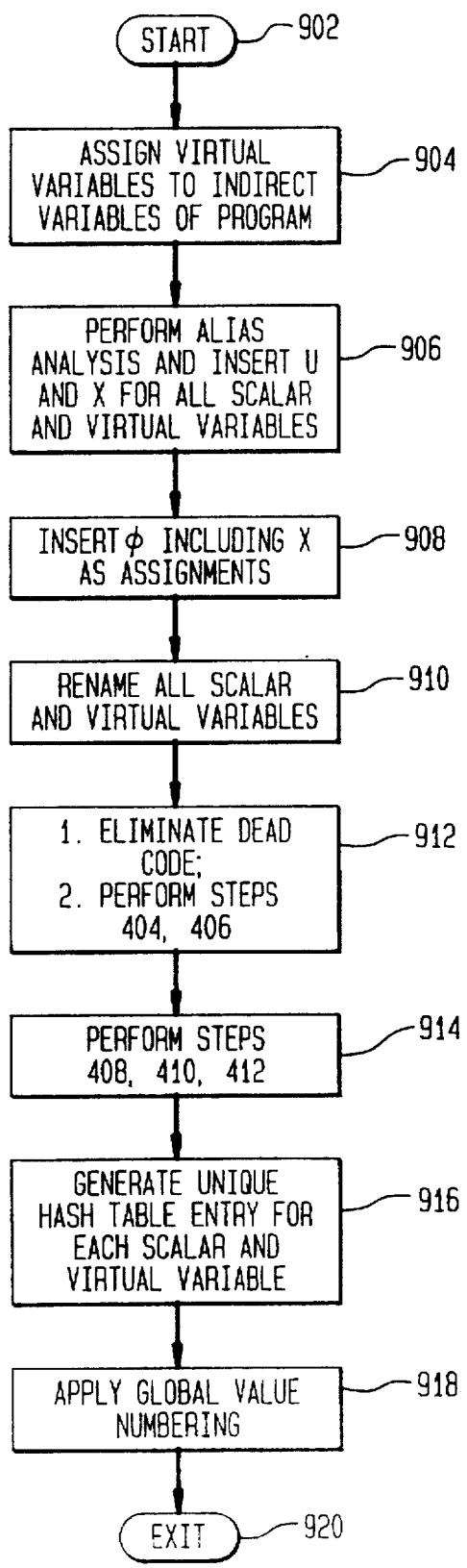
FIG. 9 is a control flow diagram representing the operation of building the HSSA representation of a program.

FIG. 9 is a control flow diagram illustrating the operation of building the HSSA representation of the program. Processing starts at step 902 and immediately proceeds to step 904. In step 904, the compiler 106 assigns virtual variables to the indirect variables in the program. The optimizer 106 then proceeds to step 906. In step 906, the optimizer 106 performs alias analysis and inserts $\mu$ and $\chi$ for all scalar and virtual variables.

The optimizer 106 proceeds to step 908. In step 908, the optimizer 106 inserts the $\phi$ function according to the prior art, but includes the $\chi$ function as assignments. Proceeding to step 910, the optimizer 106 renames all scalar and virtual variables according to the prior art. Continuing to step 912, the optimizer 106 performs several tasks simultaneously. First, the optimizer 106 performs dead code elimination to eliminate dead assignments, including $\phi$ and $\chi$. Second, the optimizer 106 performs steps 404 and 406 to compute zero versions as described above and sets the HasRealOcc flag for all variable versions.

After step 912, the optimizer 106 proceeds to step 914. In step 914, the optimizer 106 performs steps 408, 410 and 412 to compute zero versions as described above and sets variable versions to zero. The optimizer 106 continues to step 916. In step 916, the optimizer 106 hashes a unique value number and creates the corresponding hash table var node for each scalar and virtual variable version that are determined to be live. Only one node needs to be created for the zero versions of each variable.

The optimizer 106 proceeds from step 916 to step 918. In step 918, the optimizer 106 conducts a pre-order traversal of the dominator tree of the control flow graph of the program and applies global value numbering to the code in each basic block. The following sub-steps are performed in step 918.

a. Hash expression trees bottom up into the hash table, searching for any existing matching entry before creating each new value number and entry. At a var node, use the node created in step 916 for that variable version;

b. For two ivar nodes to match, two conditions must be satisfied: (i) their address expressions have the same value number, and (ii) the versions of their virtual variables are either the same, or are separated by definitions that do not alias with the ivar. The second condition requires the traversal up the use-def chain of the virtual variable starting from the current version to look for occurrences of the same ivar node that are unaffected by stores associated with the same virtual variable. For example, a store to a[i$_1$+1] after a use of a[i$_1$] does not invalidate a[i$_1$]. Because the use-def chain must be traversed, processing the program in a pre-order traversal of the dominator tree of the control flow graph guarantees that the earlier definitions are always processed;

c. For each assignment statement, including $\phi$ and $\chi$, represent its left hand side by making the statement point to the var or ivar node for direct and indirect assignets respectively. Also, make the var or ivar node point back to its defining statement; and d. Update all $\phi$, $\mu$ and $\chi$ operands and results to make them refer to entries in the hash table.

Figure 10:
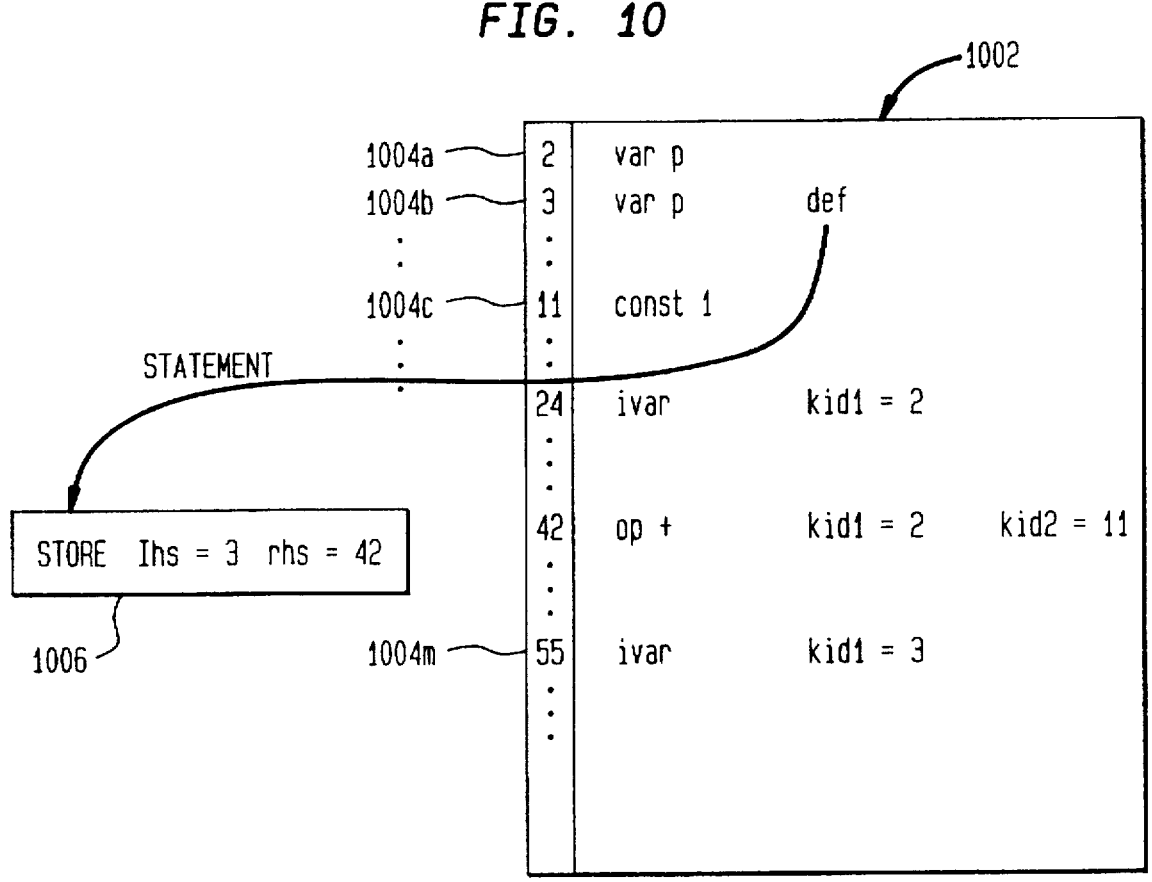
FIG. 10 is a block diagram illustrating HSSA representation.

Once the entire program has been represented in HSSA form, the original input program can be deleted. FIG. 10 is a conceptual HSSA representation for the above example of Renaming Indirect Variables. In the preferred embodiment of the present invention, each entry 1004a–1004m of the hash table 1002 uses a linked list for all the entries whose hash numbers collide, and the value number is represented by the pair <index,depth> 1006. It would be readily apparent, however, to one skilled in the relevant art to implement an alternative data structure for representing the entries of the hash table whose hash numbers collide.

The HSSA form is more memory efficient than ordinary representations because of structure sharing resulting from DAGs. Compared to ordinary SSA form, HSSA also uses less memory because it does not provide def-use information, while use-def information is much less expensive because multiple uses are represented by a common node. Many optimizations can run faster on HSSA because they only need to be applied just once on the shared nodes. The various optimizations can also take advantage of the fact that it is trivial to check if two expressions compute the same value in HSSA.

An indirect memory operation is a hybrid between expression and variable, because it is not a leaf node but operates on memory. The HSSA representation of the present invention captures this property, so that it can benefit from optimizations applied to either expressions or variables.

With the present invention, optimizations developed for scalar variables in SSA form can now be applied to indirect memory operations. With the use-def information for indirect variables, indirect loads can be substituted for their known values, performing constant propagation or forward substitution. Further, equivalances among expressions that include indirect memory operations can be recognized and exploited. Still further, useless direct and indirect stores can be removed at the same time while performing dead code elimination.

The most effective way to optimize indirect memory operations is to promote them to scalars when possible. This optimization is called indirection removal, which refers to the conversion of an indirect store and its subsequent indirect loads to direct store and loads. This promotion to scalar form enables it to be allocated to register, thus eliminating accesses to memory. An indirect variable can be promoted to a scalar whenever it is free of aliases. This can be verified by checking for the presence of its virtual variables in $\mu$'s and $\chi$'s. Promotion of an ivar mode can be effected by overwriting it with the contents of the new var node, thus avoiding rehashing its ancestor nodes in the DAG representation.

Optimization opportunities in indirect memory operations depends heavily on the quality or extent of alias analysis.

Implementing the present invention in an optimizer enables programs to benefit directly from any improvements in the results of the alias analyzer.

7. Benchmark Measurements

The preferred embodiment of the present invention is very effective in reducing overall compilation time of software programs. The following measurements were made in the production global Optimizer (OPT) which incorporated the preferred embodiment of the present invention as described herein. In addition to the optimizations described above, OPT also performs bit-vector-based partial redundancy elimination and strength reduction. From the input program, it builds HSSA and uses it as its only internal program representation until it finishes performing all its optimizations. The benchmark measurements, however, focus on the effects that zero versioning and the commonizing of indirect variables have on the HSSA representation in the optimizer. The benchmark measurements were made for a set of eight routines, seven of which are from the SPEC95 benchmark suites. SPEC95 benchmark suites are a set of industry-wide standard software routines that are used by all compiler manufacturers for performance evaluation. Table 1 describes these routines. Progressively larger routines were picked to show the effects of the present invention as the size of the routines increases. The number shown does not include the effects of inter-procedural alias analysis.

TABLE 2

Effects of zero versioning

| | number of nodes | | | | percentage reduction | | compilation speedup |
|---|---|---|---|---|---|---|---|
| | zero version off | | zero version on | | | | |
| routines | all | vars | all | vars | all | vars | |
| tomcatv | 1803 | 1399 | 844 | 440 | 53% | 69% | 4% |
| loops | 7694 | 6552 | 2493 | 1351 | 68% | 79% | 9% |
| kernel | 9303 | 8077 | 2974 | 1748 | 68% | 78% | 6% |
| twldrv | 33683 | 31285 | 6297 | 3899 | 81% | 88% | 11% |
| Data_path | 489 | 365 | 340 | 216 | 30% | 41% | 2% |
| compress | 759 | 647 | 367 | 255 | 52% | 61% | 4% |
| Query_Ass | 5109 | 4653 | 1229 | 773 | 76% | 83% | 12% |
| eval | 62966 | 59164 | 9689 | 5887 | 85% | 90% | 45% |

With zero versioning being applied, Table 3 shows the effects of commonizing indirect variables on the HSSA representation. Ivar nodes account for between 6% to 21% of the total number of nodes in the sample programs. Commonizing ivar nodes reduces the ivar nodes between 3% to 58%. In each case, the total number of nodes decreases more than the number of ivar nodes, showing that commonizing the ivar nodes in turn enables other operators that operate on them to be commonized. Though the change

TABLE 1

Description of routines used in benchmark measurements

| Routine | Language | Description |
|---|---|---|
| tomcatv | FORTRAN | 101.tomcatv, SPECfp95 |
| loops | FORTRAN | subroutine loops from 103.su2cor, SPECfp95 |
| kernel | FORTRAN | routine containing the 24 Lawrence Livermore Kernels |
| twldrv | FORTRAN | subroutine twldrv from 145.fpppp, SPECfp95 |
| Data_path | C | function Data_path from 124.m88ksim, SPECint95 |
| compress | C | function compress from 129.compress, SPECint95 |
| Query_Ass | C | function Query_AssertOnObject from 147.vortex, SPECint95 |
| eval | C | function eval from 134.perl, SPECint95 |

The HSSA representation is characterized by the number of nodes in the hash table needed to represent the program. Without zero versioning, Table 2 shows that var nodes can account for up to 94% of all the nodes in the hash table. Applying zero versioning decreases the number of var nodes between 41% to 90%. The numbers of nodes needed to represent the programs are reduced between 30% to 85%. Note that the counts for non-var nodes remain constant, since only variables without real occurrences are converted to zero versions. Having to deal with less nodes, the time spent in performing global optimization is reduced between 2% to 45%. The effect of zero versioning depends on the amount of aliasing in the program. Zero versioning also has bigger effects on large programs, since there are more variables affected by each alias. No noticeable difference is found in the running time of the benchmarks due to zero versioning.

in the total number of hash table nodes is not significant, the main effect of this technique is in preventing missed optimizations, like global common subexpressions, among indirect memory operations.

TABLE 3

Effects of the global commonizing if ivar nodes

| | number of nodes | | | | | |
|---|---|---|---|---|---|---|
| | ivar commoning off | | ivar commoning on | | percentage reduction | |
| routines | all nodes | ivar nodes | all nodes | ivar nodes | all nodes | ivar nodes |
| tomcatv | 844 | 124 | 828 | 111 | 2% | 10% |
| loops | 2493 | 453 | 2421 | 381 | 3% | 16% |
| kernel | 2974 | 398 | 2854 | 306 | 4% | 23% |
| twldrv | 6297 | 506 | 6117 | 333 | 3% | 34% |
| Data_path | 340 | 44 | 320 | 30 | 6% | 32% |
| compress | 367 | 21 | 365 | 19 | 0.5% | 10% |
| Query_Ass | 1229 | 183 | 1218 | 173 | 1% | 5% |
| eval | 9689 | 1994 | 9114 | 1504 | 6% | 25% |

The present invention implements a practical system and method that efficiently model aliases and indirect memory operations in SSA form. Zero versioning prevents large variations in the representation overhead due to the amount of aliasing in the program, with minimal impact on the quality of the optimizations. The HSSA form captures the benefits of SSA while efficiently representing program constructs using global value numbering. Under HSSA, the integration of alias handling, SSA and global value numbering enables indirect memory operations to be globally commonized. Generalizing SSA to indirect memory operations in turn allows them to benefit from optimizations developed for scalar variables. These are all necessary ingredients for SSA to be used in a production-quality global optimizer.

Conclusion

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An optimizer for representing aliases in single static assignment (SSA) during compilation of a program having one or more basic blocks of source code, comprising:

a SSA scalar means for converting all scalar variables of said program to SSA form, said SSA form including a plurality of variable versions, zero or more occurrences of a $\chi$ function, zero or more occurences of a $\phi$ function, and zero or more occurrences of a $\mu$ function, wherein said $\chi$ function, said $\phi$ function, and said $\mu$ function are inserted for one or more said variable versions;

a zero version determining means for determining whether a variable version can be renamed to a zero version; and a zero version renaming means for renaming said variable version to said zero version if said zero version determining means determines that said variable version can be renamed to a zero version.

2. The optimizer according to claim 1, said zero version determining means comprising:

a $\chi$ determining means for determining whether a first variable version that is defined by said $\chi$ function has a real occurrence in said program, and a $\phi$ determining means for determining whether at least one operand of said $\phi$ function is said zero version, wherein a second variable version is defined by said $\phi$ function; and said zero version renaming means comprising a means for setting said first variable version to said zero version if said $\chi$ determining means determines that said first variable version is defined by said $\chi$ function and has said real occurrence in said program, and for setting said second variable version to said zero version if said $\phi$ determining means determines that said at least one operand of said $\phi$ function is said zero function and second variable version is defined by said $\phi$ function.

3. The optimizer according to claim 1, further comprising:

a SSA virtual means for converting all indirect variables of a program to SSA form, said SSA form including a plurality of virtual versions such that a virtual version is assigned to an indirect variable, zero or more occurrences of a $\chi$ function, zero or more occurences of a $\phi$ function, and zero or more occurrences of a $\mu$ function, wherein said $\chi$ function, said $\phi$ function, and said $\mu$ function are inserted for one or more said virtual variables;

a hashing means for hashing a unique value number and creating a corresponding hash table entry for each said variable version and each said virtual variable remaining after said zero version determining means and said zero version renaming means; and a global value numbering means for applying global value numbering to each said basic block of said program.

* * * * *